US008942526B2

United States Patent
Lichtenwalner et al.

(10) Patent No.: US 8,942,526 B2
(45) Date of Patent: Jan. 27, 2015

(54) MINIATURIZED OPTICAL FIBER DROP CABLE

(71) Applicant: CommScope, Inc. of North Carolina, Hickory, NC (US)

(72) Inventors: Joseph J. Lichtenwalner, Newton, NC (US); Jarrett S. Shinoski, Hickory, NC (US); Vo Loc, Hickory, NC (US); Shawn L. Burch, Taylorsville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 4 days.

(21) Appl. No.: 13/672,735

(22) Filed: Nov. 9, 2012

(65) Prior Publication Data

US 2013/0121654 A1 May 16, 2013

Related U.S. Application Data

(60) Provisional application No. 61/558,341, filed on Nov. 10, 2011.

(51) Int. Cl.
*G02B 6/44* (2006.01)
*G02B 6/245* (2006.01)

(52) U.S. Cl.
CPC ............ *G02B 6/4429* (2013.01); *G02B 6/4403* (2013.01); *G02B 6/4495* (2013.01); *G02B 6/4479* (2013.01); *G02B 6/245* (2013.01); *G02B 6/4471* (2013.01)
USPC ................................. 385/100; 385/113; 225/1

(58) Field of Classification Search
CPC .................. G02B 6/44; G02B 6/4401; G02B 6/4429–6/4433
USPC ................. 385/100, 109–113; 225/1
See application file for complete search history.

(56) References Cited

U.S. PATENT DOCUMENTS

| 4,467,138 | A | * | 8/1984 | Brorein .......................... 174/115 |
| 4,729,628 | A | | 3/1988 | Kraft et al. |
| 4,815,814 | A | * | 3/1989 | Ulijasz ........................... 385/114 |
| 5,180,890 | A | * | 1/1993 | Pendergrass et al. ....... 174/117 F |
| 5,218,659 | A | * | 6/1993 | Schneider ..................... 385/110 |
| 5,448,670 | A | | 9/1995 | Blew et al. |
| 5,802,231 | A | * | 9/1998 | Nagano et al. ................ 385/114 |
| 7,123,801 | B2 | * | 10/2006 | Fitz .............................. 385/105 |
| 7,397,992 | B1 | | 7/2008 | Blazer et al. |
| 8,388,242 | B2 | * | 3/2013 | Kachmar et al. ............... 385/95 |
| 8,500,341 | B2 | * | 8/2013 | Zimmel et al. ................. 385/81 |

(Continued)

FOREIGN PATENT DOCUMENTS

| GB | 2208945 | 4/1989 |
| WO | 2010/105657 | 9/2010 |

*Primary Examiner* — Ellen Kim
(74) *Attorney, Agent, or Firm* — Muncy, Geissler, Olds & Lowe, P.C.

(57) ABSTRACT

A fiber optic cable includes first and second optical fibers. A fiber section surrounds the fibers and is formed of a first material. First and second strength members are adjacent to the fiber section on opposite sides thereof. A jacket surrounds the first and second strength members and fiber section. The jacket is formed of a second material, stronger than the first material and which does not adhere to the first material. The jacket may be manually torn open to access the fiber section. The fiber section may be manually pinched and stripped cleanly from the fibers. The fiber section acts as a cocoon to protect the fibers when the jacket is opened and cleanly pulls off of the fibers by manual force.

13 Claims, 7 Drawing Sheets

(56) References Cited

U.S. PATENT DOCUMENTS

| | | | |
|---|---|---|---|
| 8,682,124 B2 * | 3/2014 | Logan | 385/100 |
| 2003/0228116 A1 | 12/2003 | Davis et al. | |
| 2012/0167387 A1 * | 7/2012 | Lu et al. | 29/857 |

* cited by examiner

MINIATURIZED OPTICAL FIBER DROP CABLE

This application claims the benefit of U.S. Provisional Application No. 61/558,341, filed Nov. 10, 2011, the entire contents of which are herein incorporated by reference.

BACKGROUND OF THE INVENTION

1. Field of the Invention

The present invention relates to an optical fiber drop cable, and more particularly to an inexpensive, fiber drop cable having structural characteristics permitting safe, manual access to the fibers in the cable.

2. Description of the Related Art

Related art may be seen in U.S. Published Application 2003/0228116 and U.S. Pat. Nos. 5,448,670 and 7,397,992, all of which are incorporated herein by reference.

SUMMARY OF THE INVENTION

The drop cables, as typically formed in the background art, yield structures wherein it can be difficult to access the fiber or fibers when the cable is terminated to a connector. Cutting or scrapping tools are typically required to remove a jacketing material away of the area of the fibers. The use of such tools near the fibers can damage the delicate fibers. Also, Applicants have appreciated that it may be desirable and more convenient to access the fibers in a termination of a drop cable without the use of tools.

It is an object of the present invention to provide a drop cable wherein the fibers can be accessed manually without the use of tools.

It is an object of the present invention to provide a drop cable with a fiber section, functioning as a protective cocoon material, surrounding the fibers of the cable, wherein the fiber section may be manual pinched and cleanly pulled off of the fibers.

It is an object of the present invention to provide a drop cable with a jacket section having one or more scores, which enable the jacket section to be manually torn open to access a fiber section within the cable.

It is an object of the present invention to provide a drop cable with one or more strength members, which can be manually separated from a jacket section of the drop cable after the jacket section is torn open.

One or more of these objects is accomplished by a fiber optic cable including at least one optical fiber. A fiber section surrounds the at least one optical fiber. The fiber section is formed of a first material. At least one strength member is adjacent to and outside of the fiber section. A jacket section surrounds the fiber section and the at least one strength rod. The jacket section is formed of a second material, different than the first material.

One or more of these objects is accomplished by a fiber optic cable including first and second optical fibers. A fiber section surrounds the first and second optical fibers. The fiber section is formed of a first material. A first strength member is adjacent to a first side of the fiber section. A second strength member is adjacent to a second side of the fiber section. A jacket section surrounds the fiber section and the first and second strength members. The jacket section is formed of a second material, different than the first material.

One or more of these objects is accomplished by a method of terminating a fiber optic cable to prepare it for attachment to a connector. The method including manually tearing a jacket section at an end of a cable open by pinching a first portion of the jacket section surrounding a first strength member with a first hand and pinching a second portion of the jacket section surrounding a second strength member with a second hand, and then pulling the first and second portions away from each other. Spreading the first and second portions to pop out a fiber section within the cable between the first and second strength members. Pinching a first material of the fiber section with a user's fingers and manually stripping the first material off of at least one optical fiber embedded within the fiber section.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
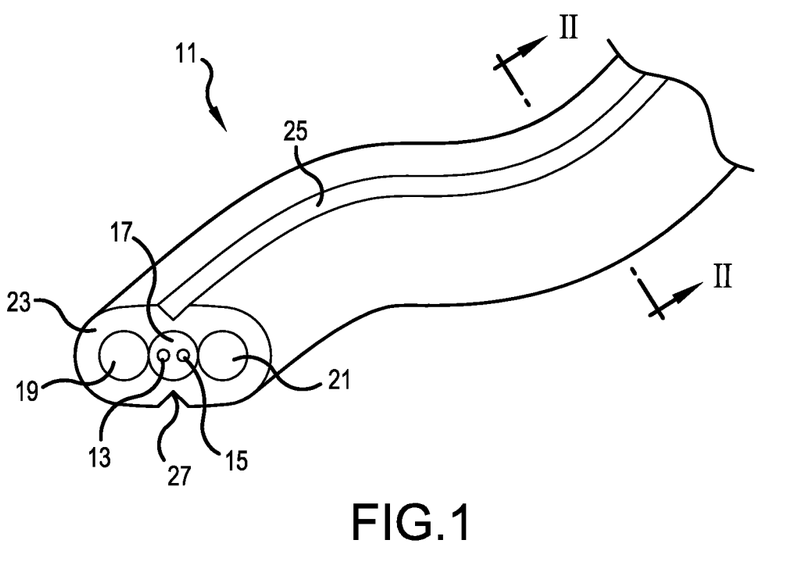
FIG. 1 is a perspective view of an end of a drop cable, in accordance with a first embodiment of the present invention.
Figure 2:
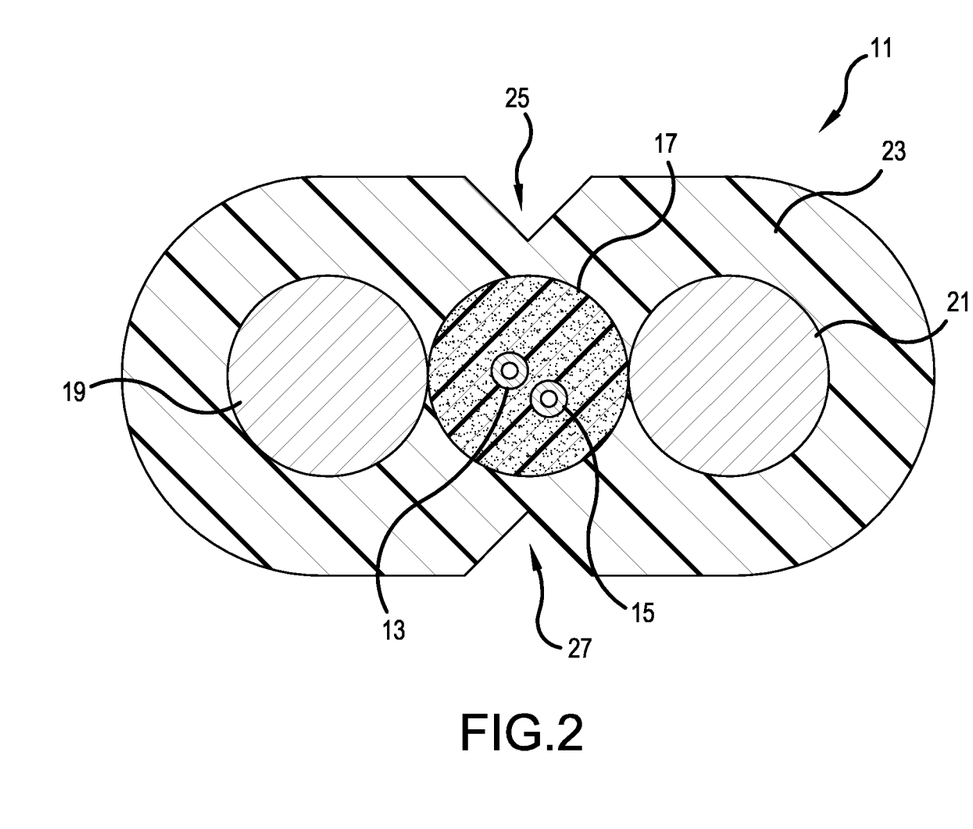
FIG. 2 is a cross sectional view taken along line II-II in FIG. 1.

An optical fiber drop cable, in accordance with one embodiment of the present invention, could be referred to as a flat drop cable. In one embodiment of a cable of the present invention, as depicted in FIGS. 1 and 2, the cable 11 includes first and second optical fibers 13 and 15. A fiber section 17 surrounds the first and second optical fibers 13 and 15, wherein said fiber section 17 is approximately circular in cross section.

First and second strength members, such as first and second strength rods 19 and 21, are disposed adjacent to, and outside of, the fiber section 17. The strength rods 19 and 21 may be glass-reinforced plastic (GRP) rods, each having the general shape of a cylinder and having an approximately circular cross section. A jacket section 23 surrounds the fiber section 17 and the first and second strength rods 19 and 21. As best seen in FIG. 2, the first and second strength rods 19 and 21 reside adjacent to "opposite edges" of the first material forming the fiber section 17, e.g., about one hundred eighty degrees apart. Also, in FIG. 2, the first and second strength rods 19 and 21 contact or abut to those opposite edges of the first material forming the fiber section 17.

An outer surface of the jacket section 23 includes a first score line or recessed portion 25 on the top and a second score line or recessed portion 27 on the bottom. The score lines 25 and 27 assist in tearing the jacket section 23 off of the fiber section 17.

The fiber section 17 is formed of a first material and the jacketing section 23 is formed of a second material, different than the first material. In a preferred embodiment, the second material separates easily from the first material, and the first material is weaker than the second material.

In one embodiment, the first material of the center section or fiber section 17 is foamed (e.g., air impregnated into a solid material) and/or formed of a Low Smoke Zero Halogen material, e.g., Megolon HF 8142, and the second material of the jacket section 23 is formed of PVC or GW 3042 Black LCF. The first material may have a minimum strength of 1300 psi and a maximum strength of 2000 psi per ASTM D638 Type IV specimen. The first material has a tensile elongation of 100% minimum and 200% maximum per ASTM D638 Type IV specimen. Of course, other materials may be employed in fiber section 17 and jacket section 23 to achieve one or more of the objects of the invention, as will be described below.

Figure 3:
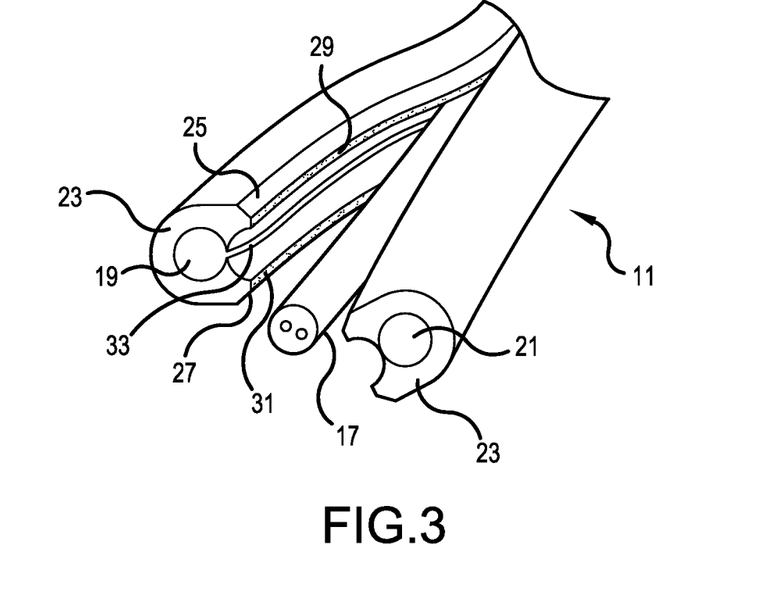
FIG. 3 is a perspective view of the end of the drop cable in FIG. 1 after the cable is manually torn open.

As illustrated in FIG. 3, a user may grasp the jacket section 23 surrounding the first strength rod 19 with a first hand and grasp the jacket section 23 surrounding the second strength rod 21 with a second hand and tear the cable 11 open. The cable 11 will tear at the first and second score lines 25 and 27 using only manual force, resulting in upper and lower torn sections 29 and 31. As the cable's jacket section 23 is torn, the center fiber section 17 will pop out freely. This occurs because the first material is selected so as to not stick to the second material and/or the first material is coated with a nonstick coating, e.g., polytetrafluoroethylene.

Figure 4:
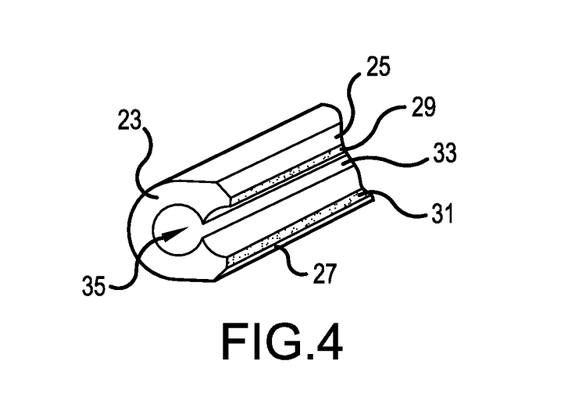
FIG. 4 is a perspective view of a left half of the jacket section, which has been torn or cut off of the end of the drop cable.
Figure 5:
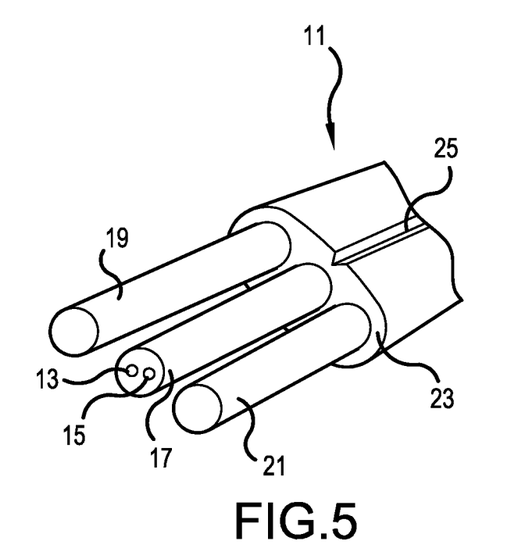
FIG. 5 is a perspective view of the end of the drop cable in FIG. 3 after the left and right halves of the jacket section have been removed.

As seen in FIG. 3, the contact point between the first strength rod 19 and the fiber section 17 is now a gap 33, exposing a length or length segments of the first strength rod 19 within the jacket section 23. The jacket section 23 may be pealed off of the first strength rod 19 manually, with the first strength rod 19 exiting the jacket section 23 via the gap 33, thus leaving a void 35 in the jacket section 23 (See FIG. 4). This pealed portion (FIG. 4) of the jacket section 23 can be cut off, or pulled off, of the remaining cable 11 using a knife or pliers if desired. The same process may be performed on the jacket section 23 surrounding the second strength rod 21, such that the resultant cable end will appear as depicted in FIG. 5.

Figure 6:
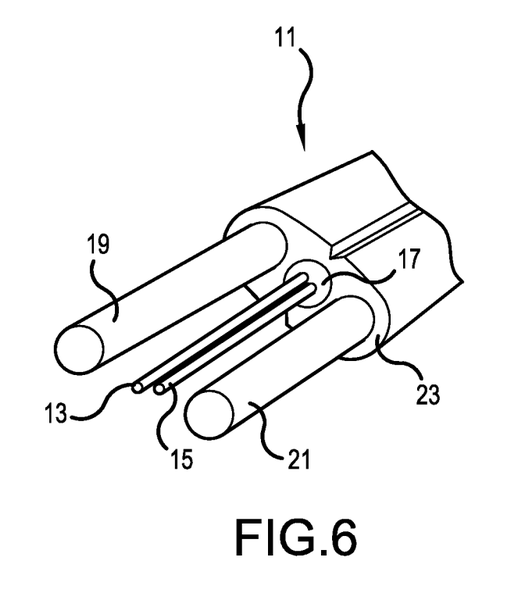
FIG. 6 is a perspective view of the end of the drop cable in FIG. 5 after the fiber section surrounding first and second fibers has been removed.

In a preferred embodiment, the first material of the fiber section 17 is selected to be weak. The first material may be manually pinched off of the first and second fibers 13 and 15 resulting in the end view depicted in FIGS. 6 and 7. In a preferred embodiment, the exposed outer surfaces of the first and second optical fibers 13 and 15 present different colors to facilitate proper identification and orientation when terminated to a connector envelope. For example, the first and second fibers 13 and 15 may be embodied by 250 micron fibers in blue and orange, respectively.

Figure 7:
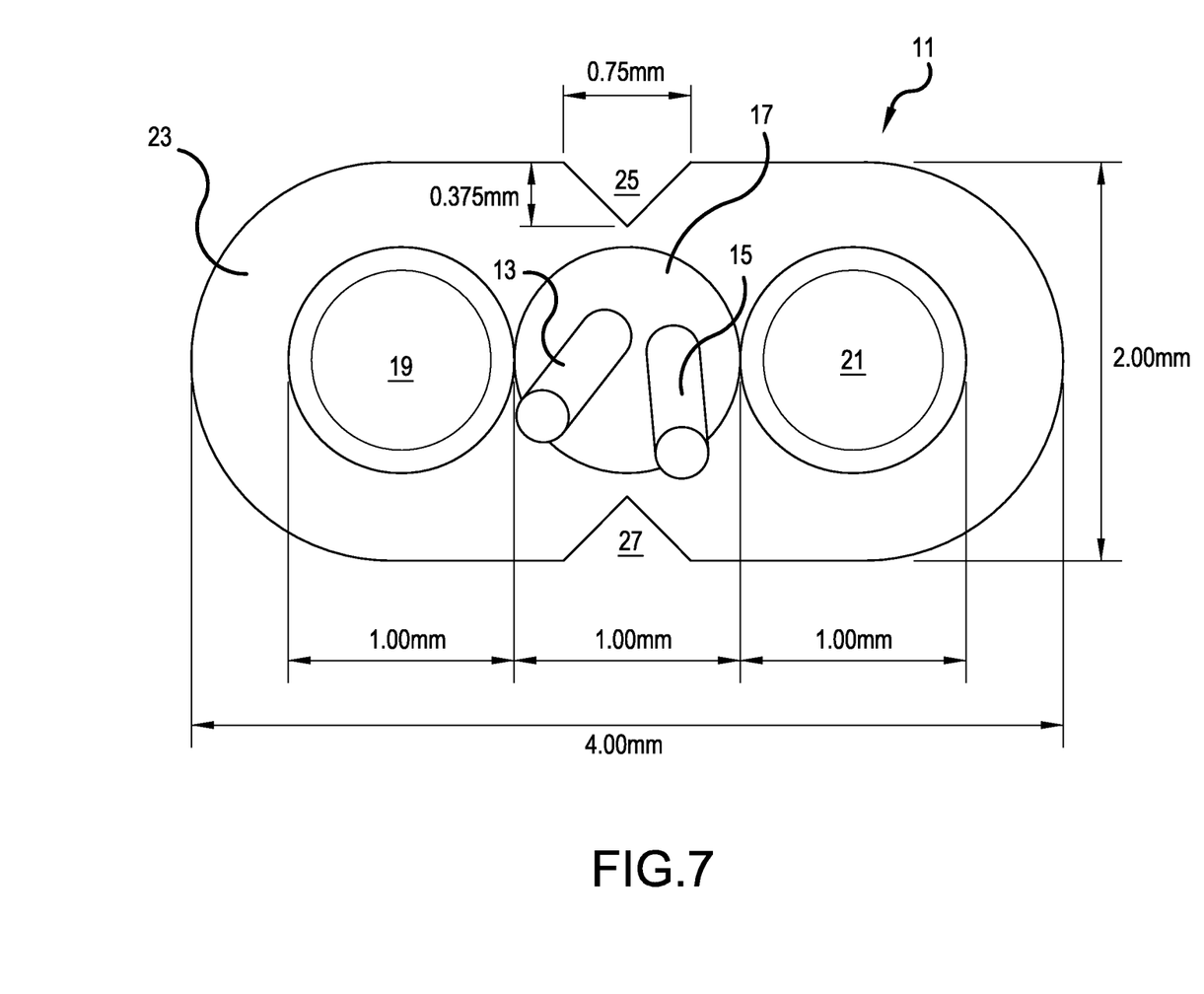
FIG. 7 is an end view of the drop cable of FIG. 6 providing exemplary dimensions of the features of the drop cable.

In FIG. 7, the first and second strength rods 19 and 21 are rigid and extend into and out of the page, while the first and second fibers 13 and 15 are flexible and bend downward. Preferred dimensions are also shown in FIG. 7. For example, the jacket thickness around the first and second strength rods 19 and 21 is about 0.5 mm. Of course, the dimensions are only exemplary, and one or more of the dimensions could be varied while staying within the teachings of the present invention. The strength rods 19 and 21 could be used to fix the cable 11 to a connector, e.g., to provide strain relief, or could be used for grounding at the connectors, if needed. If the first and/or second strength rods 19 and/or 21 are used for grounding, such would be constructed of a conductive material, as shown in the cross sectional hatching of FIGS. 2 and 2A, such as copper or copper-clad-steel.

Figure 8:
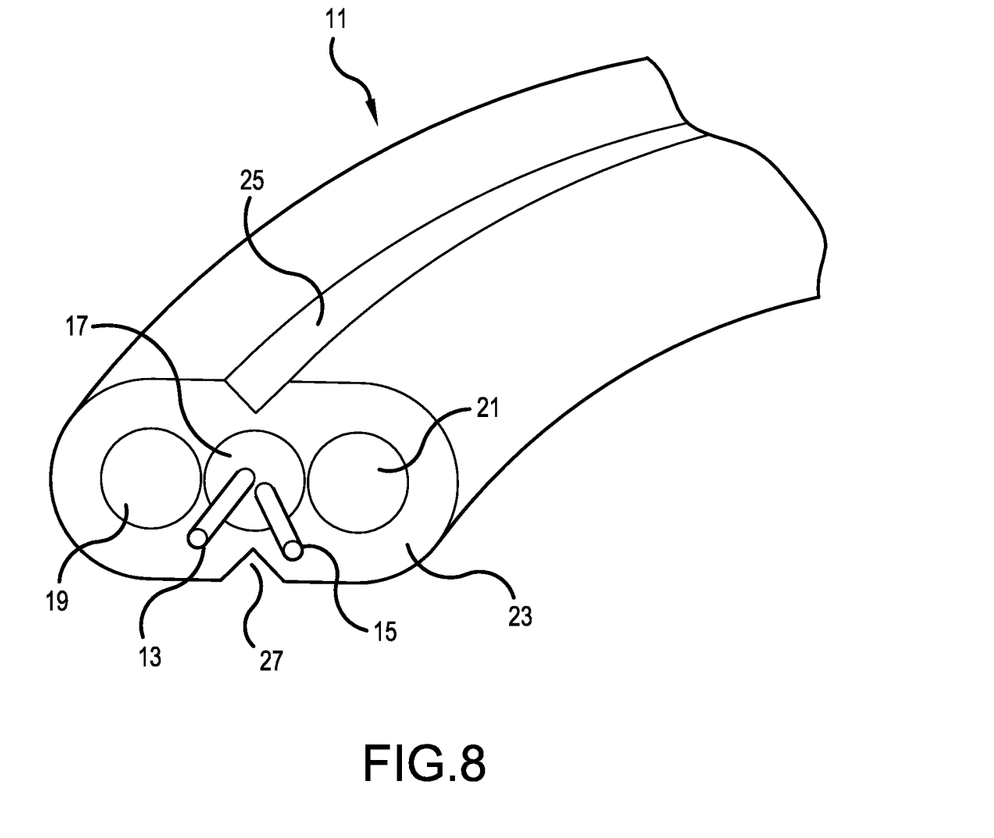
FIG. 8 is a perspective view of the end of the drop cable in FIG. 6 after first and second strength members are trimmed back.

FIG. 8 demonstrates that the first and second strength rods 19 and 21 could be cut back so that only the first and second fibers 13 and 15 extend away from the end of the cable 11. Such a configuration may be suitable for some connectors where the first and second strength rods are not needed for strain relief, or are engaged through the jacket section 23 to provide strain relief.

Figure 2A:
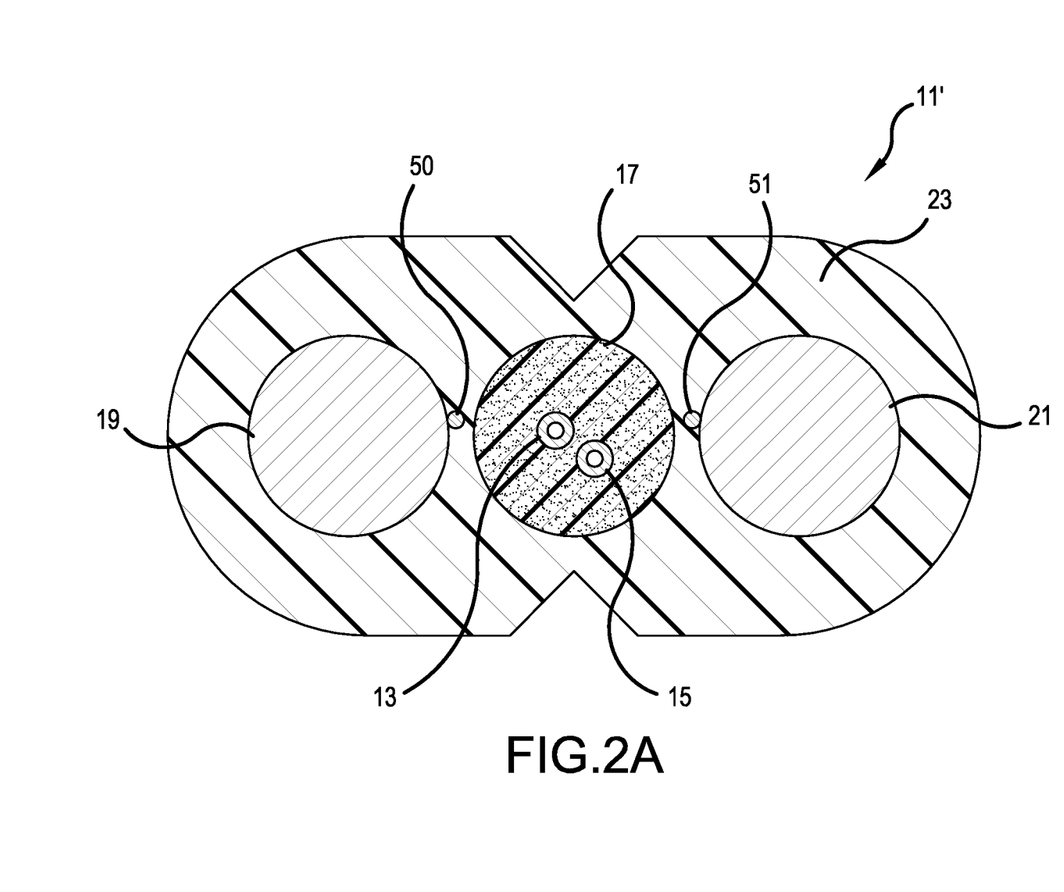
FIG. 2A is a cross sectional view similar to FIG. 2, but illustrating a drop cable in accordance with a second embodiment of the present invention.

FIG. 2A is an alternative embodiment of a cable 11', wherein the first and second strength rods 19 and 21 are further spaced from the fiber section 17. In such a circumstance, it may be more difficult to remove the first and second strength rods 19 and 21 from the jacket section 23. One or more rip cords 50, 51 may be provided to assist in removing the first and second strength rods 19 and 21 from the jacket section 23.

An optical fiber cable 11 and 11' of the present invention is useful for drop-applications, in the fiber-to-the-home (FTTH) context. The cable 11 and 11' is miniaturized to have a small form factor. The cable can accommodate one or two optical fibers. The cable is of a tubeless construction, and preferably capable of being opened without tools, and capable of having the optical fibers accessed without tools. The cable will have two strength rods running longitudinally, alongside a core material containing the optical fibers, that is placed between the two strength rods. The cable could be round in shape or flat in shape. The core material surrounding the fibers could be made from a solid material or a foamed material. The cable should be capable of being used outdoors, and possibly indoors.

It would be possible to coat the optical fibers 13 and 15 to enhance the "non-stick" relationship with the first material of the fiber section 17. It is advantageous that the first material pinches off cleanly from the first and second fibers 13 and 15 to facilitate terminations to connectors. The fiber section 17 may also be coated with a layer to prevent sticking to jacket section 23. The non-stick layers or coatings may be polytetrafluoroethylene, mineral oil, or similar substances.

The first and second fibers 13 and 15 may be single mode or multi-mode fibers.

The fiber section 17 gives the present invention advantages over a design, wherein the jacket section 23 tears directly to the fibers. The fiber section 17 acts as a cocoon to protect the fibers 13 and 15. If jacket section 23 tears directly to the fibers 13 and 15, the fibers 13 and 15 could be damaged, as the jacket section 23 is torn or removed, e.g., manually torn back. Also, portions of the jacket section 23 might remain adhered to the fibers 13 and 15. The jacketing material could complicate termination of the fibers 13 and 15 to a connector. Also if the adhered jacketing material were cut or scraped free of the fibers 13 and 15 by a cutting or scrapping tool, the fibers 13 and 15 could be damaged.

In a preferred embodiment, the overall cable 11, 11' has about a 600 N tensile loading strength. The cable 11, 11' is a small form factor and permits fiber access without tools. In the cable 11, 11', higher than normal fiber attenuation and strain are acceptable. The cable 11, 11' could be of a "modular" design, easily modified for self-support, armored, etc. Further, the first and second strength rods 19 and 21 could also be coated to reduce sticking with the material of the jacket section 23.

As previously mentioned in relation to FIG. 2A, ripcords 50 and/or 51 could be provided alongside the first and second strength rods 19 and/or 21 to tear through the material of the jacket section 23.

The material of the jacket section 23 may be formed of polyvinyl chloride (PVC), polyethylene (PE) or low smoke zero halogen (LSZH) compounds extruded over the center, fiber section 17 and the first and second strength rods 19 and 21. The fiber section 17 could be formed of a poly olefin based material, and could be formed of a foamed material. The difference between the first material and the second material could reside solely in the foaming percentages.

The drawings have depicted two optical fibers. More or fewer optical fibers may be employed in the cable. For example, the fiber section 17 may include one optical fiber, three optical fibers or four optical fibers.

The drawings have depicted two strength rods 19 and 21. More or fewer strength rods may be employed in the cable. For example, the cable may include one strength rod or three strength rods. At least two strength rods are preferred for the purpose of tearing the jacket section 23 open, using only manual force.

The drawings have depicted a mirror symmetrical cable design. Any line passing through a center of the cable in a cross sectional view will result in mirror symmetrical structures on the opposites sides of the line. The mirror symmetrical design is preferred from a manufacturing simplicity standpoint, however an asymmetrical design could achieve one or more of the objectives of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic cable comprising:
   at least one optical fiber;
   a fiber section surrounding said at least one optical fiber, said fiber section being formed of a first material;
   at least one strength member adjacent to and outside of said fiber section; and
   a jacket section surrounding said fiber section and said at least one strength member, said jacket section being formed of a second material, different than said first material, wherein said first material is weaker than said second material, wherein said first material may be manually pinched off of said at least one optical fiber, wherein said at least one optical fiber includes first and second optical fibers, wherein said at least one strength member includes first and second strength members, and wherein said first and second strength members abut to opposite edges of said first material forming said fiber section.

2. The cable according to claim 1, wherein said first material separates easily from said second material.

3. The cable according to claim 1, wherein said first material is a low smoke zero halogen material.

4. The cable according to claim 1, wherein said second material is formed of polyvinyl chloride.

5. The cable according to claim 1, wherein said first material has a strength value between about 1300 psi and about 2000 psi per ASTM D638 Type IV specimen.

6. The cable according to claim 1, wherein said first material has a tensile elongation of between about 100% and about 200% per ASTM D638 Type IV specimen.

7. The cable according to claim 1, wherein said first material is a foamed material.

8. The cable according to claim 1, wherein a non-stick layer or coating resides between at least one of:
   said fiber section and said jacket section, or
   said at least one optical fiber and said fiber section, or
   said at least one strength member and said jacket section.

9. The cable according to claim 1, wherein said first and second strength members are formed as first and second strength rods.

10. The cable according to claim 1, wherein said jacket section includes a score line or recessed portion on an outer surface to assist in tearing said jacket section off of said fiber section.

11. A fiber optic cable comprising:
   at least one optical fiber;
   a fiber section surrounding said at least one optical fiber, said fiber section being formed of a first material;
   a first strength member adjacent to a first side of said fiber section;
   a second strength member adjacent to a second side of said fiber section; and
   a jacket section surrounding said fiber section and said first and second strength members, said jacket section being formed of a second material, different than said first material, wherein said first material is weaker than said second material and separates easily from said second material, wherein said first material is a foamed material having a foaming percentage which is greater than any foaming percentage of said second material, wherein said fiber section is approximately circular in cross section, wherein said first and second strength members are formed as first and second strength rods, each having an approximately circular cross section, wherein said first and second strength rods abut to opposite edges of said fiber section, and wherein a non-stick layer or coating resides between at least one of:
   said fiber section and said jacket section, or
   said first and second optical fibers and said fiber section, or
   said first and second strength members and said jacket section.

12. A method of terminating a fiber optic cable to prepare it for attachment to a connector, the method comprising:
   manually tearing open a jacket section at an end of a cable by pinching a first portion of the jacket section surrounding a first strength member with a first hand and pinching a second portion of the jacket section surrounding a second strength member with a second hand and then pulling the first and second portions away from each other;
   spreading the first and second portions to pop out a fiber section within the cable between the first and second strength members; and
   pinching a first material of the fiber section with a user's fingers and manually stripping the first material off of at least one optical fiber embedded within the fiber section.

13. The method of claim 12, further comprising:
   removing the first portion of the jacket section from the first strength member and tearing or cutting the first portion of the jacket section from remaining portions of the jacket section; and
   removing the second portion of the jacket section from the second strength member and tearing or cutting the second portion of the jacket section from remaining portions of the jacket section.

\* \* \* \* \*